Nov. 20, 1934.   S. MAZUR   1,981,000
NON SELF STARTING SYNCHRONOUS ELECTRIC MOTOR
Filed Nov. 23, 1931
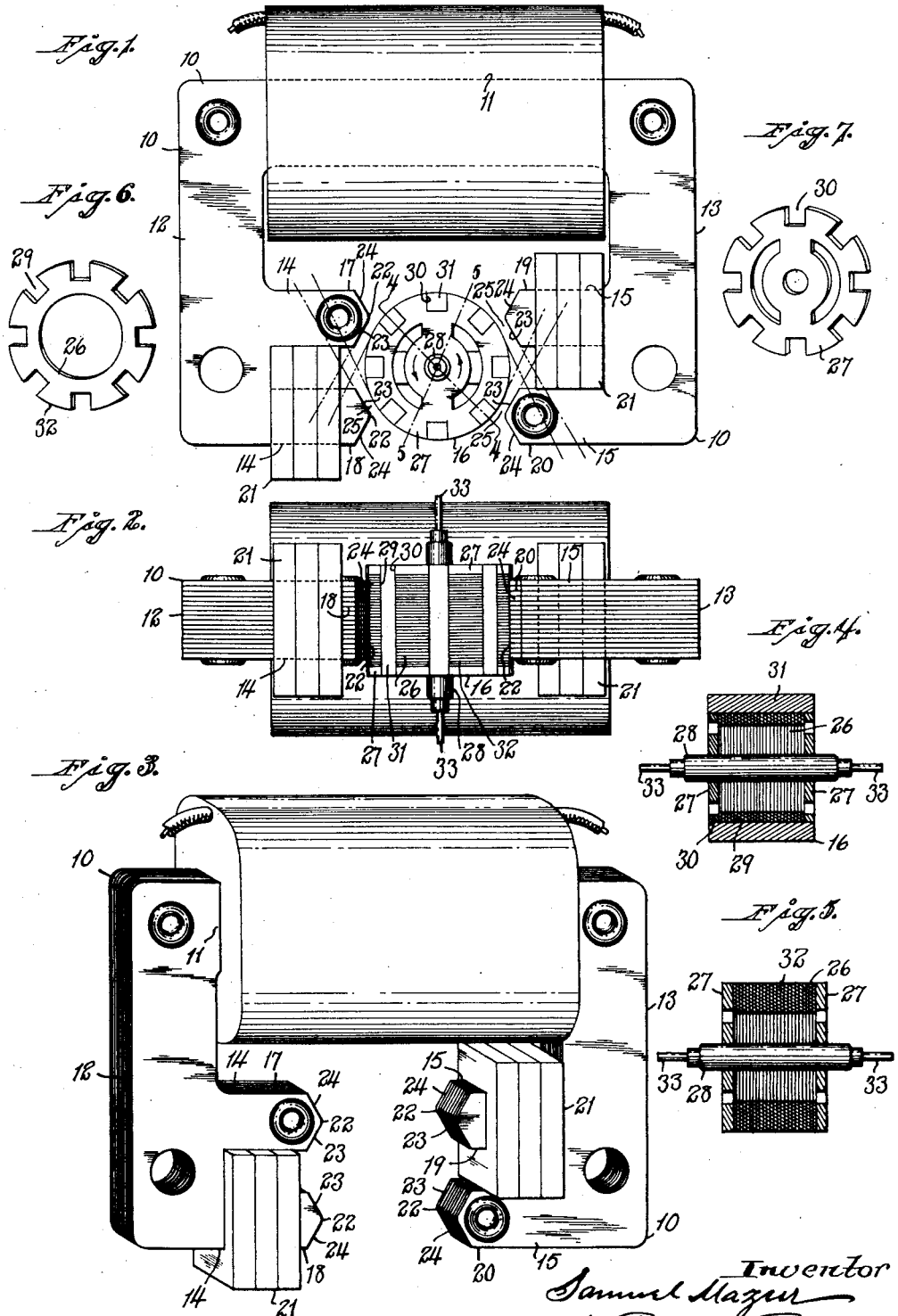
Inventor
Samuel Mazur
by Popp & Powers
Attorneys.

Patented Nov. 20, 1934

1,981,000

UNITED STATES PATENT OFFICE 1,981,000

NON-SELF-STARTING SYNCHRONOUS ELECTRIC MOTOR

Samuel Mazur, Bristol, Conn., assignor to The Sessions Clock Company, Forestville, Conn., a corporation of Connecticut Application November 23, 1931, Serial No. 576,718

2 Claims. (Cl. 172—278)

This invention relates to an improvement in non-self-starting synchronous electric motors, primarily designed for driving clock-mechanisms and other time-devices, though not so limited.

Synchronous electric clocks, as now generally marketed, fall within two classes, i. e., those propelled by self-starting synchronous motors which are known as "self-starting clocks" and those propelled by non-self-starting synchronous motors which are commonly referred to as "non-self-starting clocks."

In the event that an interruption takes place in the current supply to a self-starting synchronous clock, such a clock will resume operation immediately upon a resumption in the current supply, but will, however, fail to indicate correct time.

Under similar conditions, when an interruption in the current takes place in the current supply to a non-self-starting synchronous clock, such a clock will not resume operation until it is either manually started or started by some auxiliary device. Thus it is commonly urged in comparing self-starting synchronous clocks with non-self-starting synchronous clocks, that the latter type will either indicate correct time or none at all. There, therefore, exists a preference on the part of a considerable section of the public for clocks of the non-self-starting type, due to the advantage just mentioned.

Non-self-starting synchronous motors, however, are ordinarily difficult to manually start for the reason that their rotors must be brought into very close synchronism with the beat of the sinuous current-supply before they will "take hold," so to speak, and operate. In efforts to overcome this difficulty, many more or less clumsy, unreliable, or expensive expedients have been resorted to such, for instance, as the employment of inertia devices, the initial characteristics of which are apt to change with age and wear.

One of the main objects of my present invention is to produce, at a low cost for manufacture, a non-self-starting synchronous motor characterized by ease and facility of starting, and constructed with particular reference to relative fewness of parts, to thus minimize the likelihood of derangement and insure to a user long and uninterrupted service.

With the above and other objects in view, as will appear from the following, my invention consists in a non-self-starting synchronous electric motor having certain features of construction and combinations and arrangements of parts as will be hereinafter described and particularly recited in the claims.

In the accompanying drawing:

Fig. 1 is a face view of one form which a non-self-starting synchronous electric motor constructed in accordance with my invention may assume, the bearings for the rotor being omitted for clarity of illustration;

Fig. 2 is an edge view thereof;

Fig. 3 is a perspective view of the field-structure, detached;

Fig. 4 is a transverse sectional view through the rotor, taken on the line 4—4 of Fig. 1;

Fig. 5 is a similar view taken on the line 5—5 of Fig. 1;

Fig. 6 is a perspective view of one of the rotor-rings, detached; and

Fig. 7 is a corresponding view of one of the end-plates of the rotor, detached.

The particular non-self-starting synchronous motor herein chosen for the illustration of my invention consists, as shown, of a laminated field- or stator-structure, generally designated by the numeral 10 and formed in accordance with usual practice, of superimposed layers of sheet silicon-steel, iron, or other suitable magnetic material. For the purpose of convenience of description, the stator-structure 10 may be said to consist of a cross-reach 11 and a pair of parallel complementary arms 12 and 13 turned inwardly toward each other at their respective ends to form pole-pieces 14 and 15 respectively.

The pole-pieces 14 and 15, just above referred to, extend into relatively-close proximity to a rotor 16 on the respective opposite sides thereof, and are bifurcated or split to respectively form pole-sections 17—18 and 19—20. The pole-sections 18 and 19 have applied to them a suitable number of so-called "shading-coils" 21, usually consisting of copper or other highly-conductive plates or rings which serve to "split the phase," so to speak, inasmuch as magnetic impulses will not pass through the shaded pole-sections 18 and 19, and thence to the rotor, as rapidly as they will pass through the unshaded pole-sections 17 and 20.

The shading of one of the pole-sections of the respective pole-pieces 14 and 15 serves to create a partially-rotating magnetic field which, however, as the parts are organized and related, is not sufficient to cause the rotor 16 to self start, but in this respect merely exerts an effort to favor the rotation of the rotor in the direction indicated to substantially preclude the accidental manual starting of the rotor in a reverse direction, with the consequent effect of turning the hands of a clock backward or similarly turning any other timing-element.

The terminal of each of the respective pole-sections 17—18 and 19—20 is preferably pointed, as at 22, and reversely beveled as shown to provide each pole-piece with a primary pole-face 23, located in relatively close proximity to the periphery of the rotor 16, and a secondary pole-face 24 formed on that side of each pole-piece which is remote from the said rotor 16. The respective primary pole-faces 23, just referred to, are each so sloped as to provide a progressively-differentiated air-gap 25 between the same and the periphery of the rotor 16, for the purpose which will hereinafter appear.

The rotor 16 may be of any approved type, capable of being synchronously propelled by the field-structure, but as herein shown, it is preferably of a laminated character and composed of a plurality of rings 26 of magnetic material, arranged axially side by side to form, when so assembled with the necessary conductors, a rotor-body of tubular or cylindrical form having a substantially smooth exterior.

Arranged axially in line with, and flanking the respective opposite sides of the stack of rings 26, are end-plates 27—27, preferably formed of copper or other material of high electrical conductivity. The said end-plates 27—27 are punched out into skeletonized form for the purpose of providing ventilation through the interior of the rotor-structure, and are staked or otherwise secured to a rotor-shaft 28.

The periphery of each of the rings 26 is provided with an annular series of equidistant transverse notches 29, and similarly each of the end-plates 27—27 is formed with a corresponding annular series of notches 30. The notches 29 of the respective rings 26 are aligned with each other and with the notches 30 in the end-plates 27—27, as shown, to form an annular series of transverse grooves, into each of which is installed a short-circuiting or spacing bar 31 extending transversely of the rotor and serving not only to electrically interconnect the said end-plates 27—27 of the rotor, but also to divide the rings into a plurality of marked geometrical poles 32.

The rotor-shaft 28 is provided at its opposite ends respectively with trunnions 33—33, which are adapted to revolve in any suitable bearings, which latter, for the purpose of clarity of illustration, have been omitted from the drawing.

One of the main difficulties encountered in producing a non-self-starting synchronous electric motor is to so shape and proportion the parts as to minimize the tendency of the rotor to magnetically interlock with the field-structure without, however, sacrificing to a detrimental degree, the necessary synchronous torque. In my improved synchronous motor, as herein shown and described, in shaping the pole-sections in such manner, with respect to the periphery of the rotor, as to provide progressively-differentiated air-gaps 25 therebetween, I have succeeded in so minimizing the tendency of the rotor to magnetically interlock with the pole-pieces that the rotor may be readily brought into synchronous running speed by manually spinning the same or spinning the same by mechanical means other than the magnetic force passing through the rotor between the respective pole-pieces. The effect of the differentiated air-gaps 25, just referred to, seems to accomplish such a dispersion of the lines of magnetic force as to obviate objectionable magnetic locking tendency without, however, appreciably sacrificing the synchronous torque, as before pointed out.

The dispersion of the magnetic lines of force, before referred to, and as occasioned by the progressively forwardly widening air-gaps 25, is further enhanced by the shading of the polar-sections 18 and 19 which, in the motor herein chosen for illustration, so act together as to provide a synchronous motor which may be very readily started and which has a marked directional tendency of sufficient strength to preclude the accidental turning of the rotor in the wrong direction. Indeed, the directional tendency of the particular motor herein chosen for illustration is so marked that should the rotor be inadvertently turned in the wrong direction, the counter effect of the partially-rotating magnetic field will be of sufficient strength to, on most occasions, immediately reverse the rotor and cause the same to travel in the reverse direction. This capacity of the rotor to turn in the proper direction on most occasions, when inadevertently turned in the wrong direction, is desirable though not essential to my invention, and is accomplished without the objection, before pointed out, of having the rotor inherently self-starting.

It will be understood by those skilled in the art that my invention may assume varied physical forms without departing from my inventive concept and I, therefore, do not limit myself to the specific embodiment herein chosen for illustration, but only as indicated in the appended claims.

I claim:

1. In a non-self-starting synchronous electric motor, the combination with a rotor having a substantially-cylindrical periphery; of a stator-structure provided with a plurality of shaded polar-projections and a plurality of unshaded polar-projections positioned adjacent the said rotor and coacting to produce a rotating magnetic field of insufficient strength to normally start the said rotor from rest; the pole-faces of the said shaded polar-projections being shaped to provide air-gap flux-paths of progressively-differentiated reluctance expanding in one direction circumferentially of the rotor and the pole-faces of the said unshaded polar-projections being shaped to provide air-gap flux-paths of progressively-differentiated reluctance expanding in a direction circumferentially of the rotor but in a direction opposite to that of the said shaded polar-projections.

2. In a non-self-starting synchronous electric motor, the combination with a rotor having a plurality of polar-projections of magnetic material encircled by short-circuiting means of non-magnetic material and shaded to present a substantially-cylindrical periphery; of a stator-structure provided with a plurality of shaded polar-projections and a plurality of unshaded polar-projections positioned adjacent the said rotor and coacting to produce a rotating magnetic field of insufficient strength to normally start the said rotor from rest; the pole-faces of the said shaded polar-projections being shaped to provide air-gap flux-paths of progressively-differentiated reluctance expanding in one direction circumferentially of the rotor and the pole-faces of the said unshaded polar-projections being shaped to provide air-gap flux-paths of progressively-differentiated reluctance expanding in a direction circumferentially of the rotor but in a direction opposite to that of the said shaded polar-projections.

SAMUEL MAZUR.